US010294856B2

(12) United States Patent
Lotz (10) Patent No.: US 10,294,856 B2
(45) Date of Patent: May 21, 2019

(54) VTG TURBOCHARGER WITH WASTEGATE CONTROLLED BY A COMMON ACTUATOR

(71) Applicant: BorgWarner Inc., Auburn Hills, MI (US)

(72) Inventor: Robert Lotz, Arden, NC (US)

(73) Assignee: BorgWarner Inc., Auburn Hills, MI (US)

( * ) Notice: Subject to any disclaimer, the term of this patent is extended or adjusted under 35 U.S.C. 154(b) by 449 days.

(21) Appl. No.: 15/037,705

(22) PCT Filed: Nov. 19, 2014

(86) PCT No.: PCT/US2014/066474
§ 371 (c)(1),
(2) Date: May 19, 2016

(87) PCT Pub. No.: WO2150/080920
PCT Pub. Date: Jun. 4, 2015

(65) Prior Publication Data
US 2016/0298534 A1 Oct. 13, 2016

Related U.S. Application Data

(60) Provisional application No. 61/908,799, filed on Nov. 26, 2013.

(51) Int. Cl.
*F01D 5/02* (2006.01)
*F01D 9/04* (2006.01)
(Continued)

(52) U.S. Cl.
CPC ............... *F02B 37/24* (2013.01); *F01D 5/02* (2013.01); *F01D 9/041* (2013.01); *F01D 17/105* (2013.01);
(Continued)

(58) Field of Classification Search
CPC .......... F02B 37/24; F02B 37/186; F01D 5/02; F01D 9/041; F01D 17/105; F01D 17/162;
(Continued)

(56) References Cited

U.S. PATENT DOCUMENTS 4,893,474 A * 1/1990 Miller ............... F02B 37/18
60/602
8,281,586 B2 10/2012 Barton et al.
(Continued)

FOREIGN PATENT DOCUMENTS

KR 100802762 B1 2/2008
WO 2013163011 A1 10/2013

OTHER PUBLICATIONS

Written Opinion and International Search Report dated Feb. 26, 2015, in International Application No. PCT/US2014/066474.

*Primary Examiner* — Richard A Edgar
(74) *Attorney, Agent, or Firm* — Eric L. Doyle; Stephan A. Pendorf; Patent Central LLC (57) ABSTRACT

A variable turbine geometry (VTG) turbocharger (100) includes a VTG assembly (25) for controlling guide vanes (30) in combination with a wastegate assembly (60, 260) having a wastegate valve (62, 262) configured to control exhaust gas flow through a wastegate port (7) in the turbine housing (4) thereby selectively bypassing the turbine wheel (12). The guide vanes (30) are actuated continuously, while the wastegate valve (62, 262) only starts to open at a predetermined configuration of the VTG assembly (25) in which the guide vanes 30 are open to a set amount. For some exhaust gas flow rates, the guide vanes (30) and the wastegate valve (62, 262) are fully open at the same time. A common actuator (110, 50) controls both the guide vanes (30) and the wastegate valve (62, 262) of the wastegate assembly (60, 260).

8 Claims, 5 Drawing Sheets

(51) Int. Cl.
*F01D 17/10* (2006.01)
*F01D 17/16* (2006.01)
*F01D 25/24* (2006.01)
*F02B 37/18* (2006.01)
*F02B 37/24* (2006.01)

(52) U.S. Cl.
CPC ......... *F01D 17/162* (2013.01); *F01D 17/165* (2013.01); *F01D 25/24* (2013.01); *F02B 37/186* (2013.01); F05D 2220/40 (2013.01); F05D 2260/79 (2013.01); F05D 2270/60 (2013.01); Y02T 10/144 (2013.01)

(58) Field of Classification Search
CPC .... F01D 17/165; F01D 25/24; F05D 2220/40; F05D 2260/79; F05D 2270/60; Y02T 10/144

See application file for complete search history.

(56) References Cited

U.S. PATENT DOCUMENTS

| | | | |
|---|---|---|---|
| 2004/0096317 A1 | 5/2004 | Scholz et al. | |
| 2011/0014033 A1* | 1/2011 | Boning | F01D 17/165 415/148 |
| 2011/0097197 A1 | 4/2011 | Woo et al. | |

* cited by examiner

VTG TURBOCHARGER WITH WASTEGATE CONTROLLED BY A COMMON ACTUATOR

CROSS-REFERENCE TO RELATED APPLICATION

This application claims priority to and all the benefits of U.S. Provisional Application No. 61/908,799, filed on Nov. 26, 2013, and entitled "VTG Turbocharger with Wastegate Controlled by a Common Actuator," which is incorporated herein by reference.

BACKGROUND

Field of the Disclosure

This disclosure relates to turbochargers with Variable Turbine Geometry (VTG) in combination with a wastegate assembly. More particularly, this disclosure relates to actuating VTG guide vanes as well as a wastegate valve for controlling exhaust gas flow to a turbine wheel, such as with a common actuator.

Description of Related Art

Advantages of turbocharging include increased power output, lower fuel consumption, reduced pollutant emissions, and improved transient response. The turbocharging of engines is no longer primarily seen from a high-power performance perspective, but is rather viewed as a means of reducing fuel consumption and environmental pollution on account of lower carbon dioxide ($CO_2$) emissions. Currently, a primary reason for turbocharging is using exhaust gas energy to reduce fuel consumption and emissions. In turbocharged engines, combustion air is pre-compressed before being supplied to the engine. The engine aspirates the same volume of air-fuel mixture as a naturally aspirated engine, but due to the higher pressure, thus higher density, more air and fuel mass is supplied into a combustion chamber in a controlled manner. Consequently, more fuel can be burned, so that the engine's power output increases relative to the speed and swept volume.

In exhaust gas turbocharging, some of the exhaust gas energy, which would normally be wasted, is used to drive a turbine. The turbine includes a turbine wheel that is mounted on a shaft and is rotatably driven by exhaust gas flow. The turbocharger returns some of this normally wasted exhaust gas energy back into the engine, contributing to the engine's efficiency and saving fuel. A compressor, which is driven by the turbine, draws in filtered ambient air, compresses it, and then supplies it to the engine. The compressor includes a compressor wheel that is mounted on the same shaft so that rotation of the turbine wheel causes rotation of the compressor wheel.

Turbochargers typically include a turbine housing connected to the engine's exhaust manifold, a compressor housing connected to the engine's intake manifold, and a center bearing housing coupling the turbine and compressor housings together. The turbine housing defines a volute that surrounds the turbine wheel and that receives exhaust gas from the engine. The turbine wheel in the turbine housing is rotatably driven by a controlled inflow of exhaust gas supplied from the exhaust manifold.

SUMMARY

Several variations of devices and assemblies can be used to control the operation of the turbine stage, including wastegate assemblies and Variable Turbine Geometry (VTG) assemblies used in relationship with exhaust gas flow to the turbine wheel of turbochargers.

A wastegate assembly can be incorporated in the turbine housing of a turbocharger to regulate gas flow. A wastegated turbocharger operates with a wastegate assembly which may include a valve, vent and/or bypass that is able to selectively route a portion of the exhaust gas around (i.e. bypassing) the turbine wheel, in order to limit/control turbine work, thus selectively using a fraction of the available exhaust energy that could be extracted from the exhaust gas flow. The wastegate assembly, by selectively allowing exhaust gas to bypass the turbine wheel, reduces the turbocharger's output (or boost). The wastegate assembly regulates exhaust gas flow and ensures that the turbine wheel is not spun at an undesirable speed.

A wastegate assembly controls gas flow through a wastegate port in the turbine housing that provides communication between the exhaust gas inlet or volute passage and the exhaust gas outlet, and may include a control valve that is selectively opened by an actuator and any associated linkages. As a result, exhaust gas flow is regulated (i.e. some bypassing) though the turbine stage, in order to limit/control turbine work and control the maximum boost pressure.

A closed wastegate valve does not allow any exhaust gas to bypass the turbine wheel. Increasing the amount or degree of opening of the wastegate valve increases the amount of exhaust gas that is allowed to bypass the turbocharger turbine, which should decrease the amount of pressurized air to the intake manifold. An actuator can adjust the position of the wastegate valve relative to the wastegate port, and thus can adjust the amount of exhaust gas that bypasses the turbine through the wastegate assembly.

A turbocharger with a wastegate assembly often has a mechanical actuator for controlling the wastegate valve. The actuator may actively control flow channel geometry with flow control through the wastegate (bypass) port. The actuator of the wastegate assembly may include an arm assembly with a lever arm from a pivot point with a valve head on the lever arm's end that selectively covers a wastegate port. Similarly, the valve head may operate on an arm as a valve rod of a poppet valve or similar non-pivoting valve.

This disclosure also relates to the Variable Turbine Geometry (VTG) aspect of the turbine stage of turbochargers, with an example shown in U.S. Pat. No. 7,886,536, which is incorporated herein by reference.

VTG turbochargers allow a turbine flow cross-section leading to the turbine wheel to be varied in accordance with engine operating points. This allows the entire exhaust gas energy to be utilized and the turbine flow cross-section to be set optimally for each operating point. As a result, the efficiency of the turbocharger and hence that of the engine can be higher than that achieved with only bypass control of a wastegate assembly. Variable guide vanes in the turbine have an effect on pressure build-up behavior and, therefore, on the turbocharger power output.

A VTG turbocharger may include a VTG assembly having a vane ring assembly including a lower vane ring, an upper vane ring (which may include a unison ring), a series of guide vanes pivotally mounted at least partially between the lower vane ring and upper vane ring, and a plurality of spacers positioned between the lower vane ring and upper vane ring.

VTG turbochargers can utilize adjustable guide vanes that are pivotally connected to a lower ring and an upper vane ring, including various possible rings, and/or nozzle wall. These guide vanes are adjusted to control exhaust gas backpressure and turbocharger speed by modulating the exhaust gas flow to the turbine wheel. The guide vanes can be pivoted by vane levers, which can be located above the upper vane ring. Performance and flow to the turbine are influenced by changes of the flow angle to the turbine wheel by pivoting the guide vanes.

One goal of VTG turbochargers is to expand the usable flow rate range in practical applications while maintaining a high level of efficiency. To accomplish this, the turbine output is regulated by changing an inflow angle and inflow speed of the exhaust gas flow at a turbine wheel inlet. With VTG turbochargers, this is achieved using guide vanes in front of the turbine wheel that change their angle of attack with exhaust gas flow speed. This reduces lag at slow speeds while opening to prevent exhaust gas backpressure at higher speeds.

With VTG, turbocharger ratios can be altered as conditions change. When the guide vanes are in a closed position, the high circumferential components of the flow speed and a steep enthalpy gradient lead to a high turbine output and therefore to a high charging pressure. When the guide vanes are in a fully open position, the turbine reaches its maximum flow rate and the velocity vector of the flow has a large centripetal component. One aspect of this type of output control over bypass control is that the entire exhaust gas flow is always directed through the turbine and can be converted to output. Adjustments of the guide vanes can be controlled by various pneumatic or electrical regulators.

A VTG turbocharger may have an actuation pivot shaft with a VTG lever to help control the movement of the guide vanes. A VTG actuation pivot shaft is typically not fitted directly to a bore in the turbine housing, but more often to a stationary bearing in a bore in the turbine housing. The actuation pivot shaft is often radially located in a bearing, which can be located either in a bore, with a centerline within the turbine housing, or directly in the bearing housing depending on the design.

At the upper range of a VTG turbocharger, the turbine wheel may become a restriction in the maximum flow rate that a turbine can accept, even if the guide vanes are at the 100% fully open position. In certain applications, small turbine wheels may be preferred for specific embodiments, and it may be beneficial to prevent exhaust gas backpressure at high flow rates. To accommodate higher flow rates with a smaller turbine wheel, a wastegate assembly can be used to bypass some of the flow past the turbine wheel entirely. A turbocharger with both VTG guide vanes and a wastegate assembly in the same turbine housing can bypass exhaust gas flow with a wastegate valve at the upper ranges of the guide vanes being opened.

This disclosure further relates to a variable turbine geometry turbocharger with VTG guide vanes combined with a wastegate assembly in the same turbine housing. The guide vanes are actuated continuously, while the wastegate assembly only starts to open at a predetermined configuration of the VTG assembly in which the guide vanes are open to a set amount. In the illustrated embodiment the set amount corresponds to the guide vanes being fully open (such as 80% open to 100% fully open). The 80% vane-open engagement point is merely an example, with plausible values being from about 70-90% depending on the application of the turbocharger. The guide vanes would completely (e.g., solely) control exhaust gas flow until the set amount of opening is reached. At that time, bypass via the wastegate assembly is begun. During bypass, all exhaust gas flow is not directed through the turbine, but some flow can bypass the turbine wheel through the wastegate assembly.

Preferably, a common actuator actuates both the VTG guide vanes and the wastegate valve. Elements in association with operating the rings or pivot shaft of the VTG assembly can be used to operate a wastegate valve, either as a poppet valve or a push rod for a rotating wastegate valve.

BRIEF DESCRIPTION OF THE DRAWINGS

Advantages of the present disclosure will be readily appreciated as the same becomes better understood by reference to the following detailed description when considered in connection with the accompanying drawings wherein.

DETAILED DESCRIPTION

Figure 1:
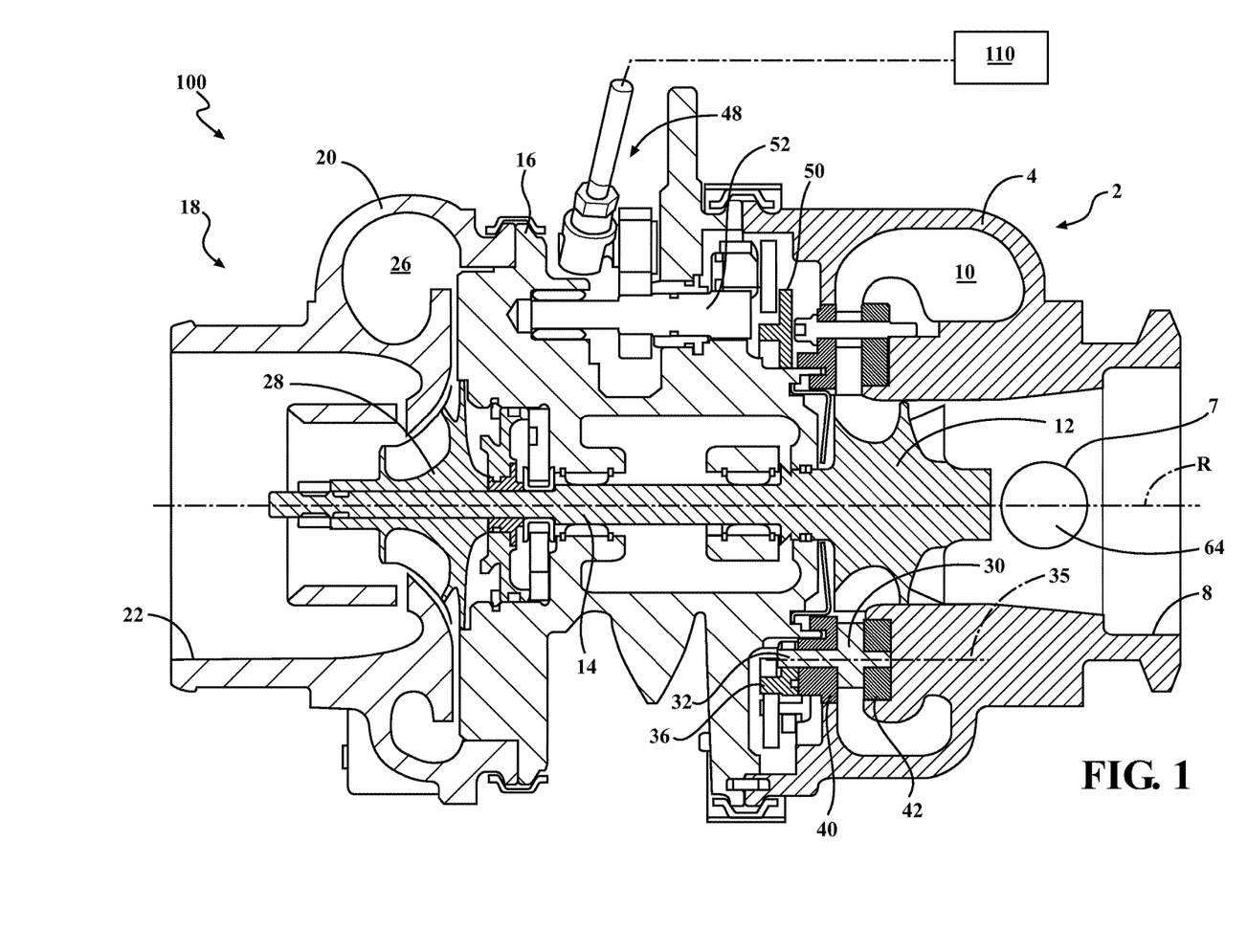
FIG. 1 is a side cross-sectional view of an exhaust gas VTG turbocharger.

Referring to FIG. 1, an exhaust gas turbocharger 100 includes a turbine section 2, the compressor section 18, and a center bearing housing 16 disposed between and connecting the compressor section 18 to the turbine section 2. The turbine section 2 includes a turbine housing 4 that defines an exhaust gas inlet 6 (FIG. 4), an exhaust gas outlet 8, and a turbine volute 10 disposed in the fluid path between the exhaust gas inlet and the exhaust gas outlet 8. A turbine wheel 12 is disposed in the turbine housing 4 between the turbine volute 10 and the exhaust gas outlet 8. A shaft 14 is connected to the turbine wheel 12, is supported for rotation about a rotational axis R within in the bearing housing 16, and extends into the compressor section 18. The compressor section 18 includes a compressor housing 20 that defines an axially-extending air inlet 22, an air outlet (not shown), and a compressor volute 26. A compressor wheel 28 is disposed in the compressor housing 20 between the air inlet 22 and the compressor volute 26, and is connected to the shaft 14.

In use, the turbine wheel 12 in the turbine housing 4 is rotatably driven by an inflow of exhaust gas supplied from the exhaust manifold of an engine (not shown). Since the shaft 14 connects the turbine wheel 12 to the compressor wheel 28 in the compressor housing 20, the rotation of the turbine wheel 12 causes rotation of the compressor wheel 28. As the compressor wheel 28 rotates, it increases the air mass flow rate, airflow density and air pressure delivered to the engine's cylinders via an outflow from the compressor air outlet, which is connected to the engine's air intake manifold.

The turbocharger 100 is a variable turbine geometry turbocharger (VTG). In particular, the turbine section 2 includes a plurality of pivotable vanes 30 to control the flow of exhaust gas that impinges on the turbine wheel 12 and control the power of the turbine section 2. The vanes 30 also therefore control the pressure ratio generated by the compressor section 18. In engines that control the production of NOx by the use of High Pressure Exhaust Gas Recirculation (HP EGR) techniques, the vanes 30 also provide a means for controlling and generating exhaust back pressure.

Figure 2:
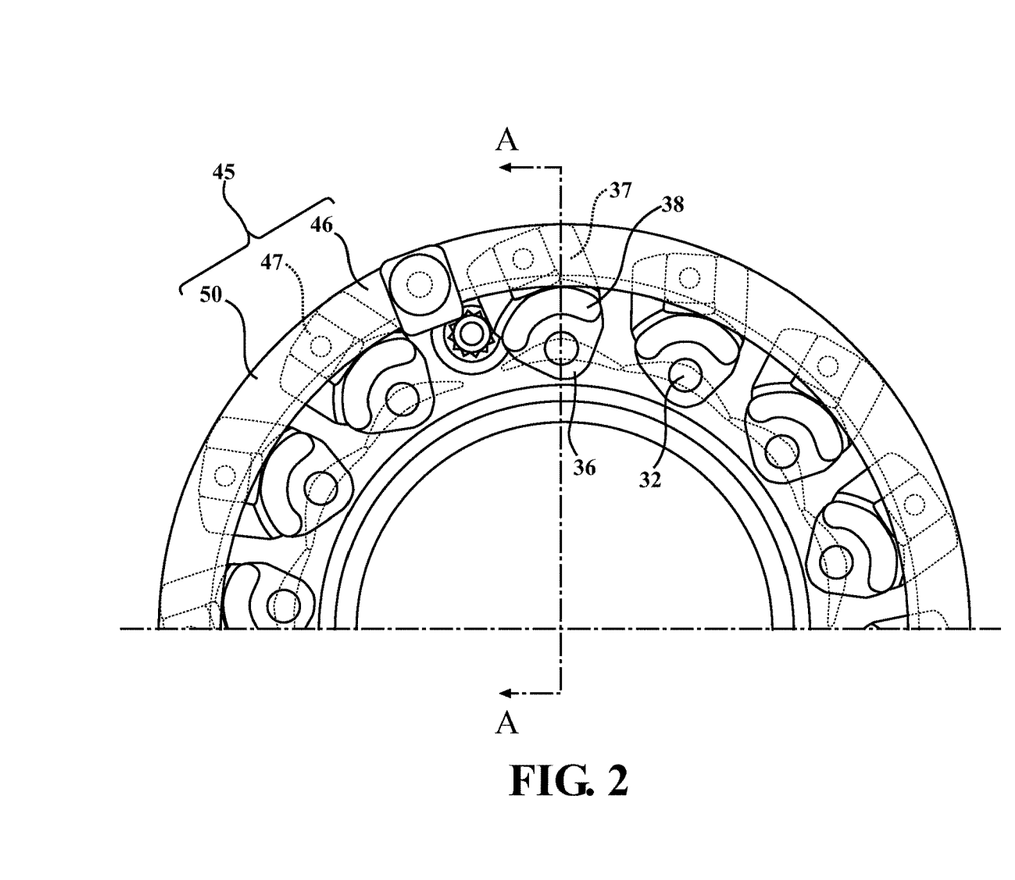
FIG. 2 is a side view of an adjustment ring assembly of the turbocharger of claim 1.
Figure 3:
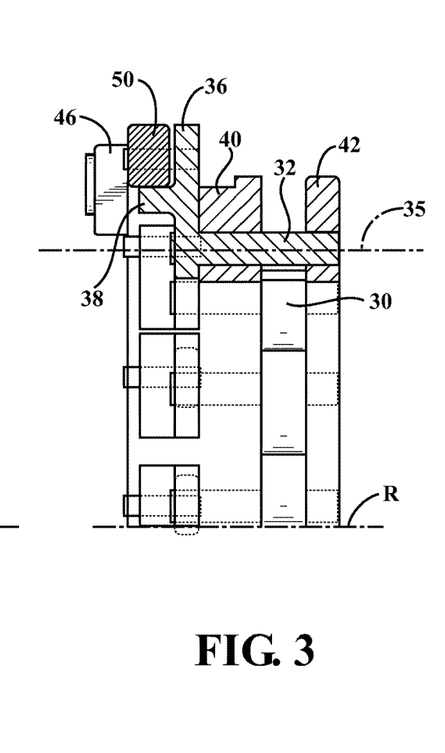
FIG. 3 is a cross-sectional view of the adjustment ring assembly as seen along line A-A of FIG. 2.

Referring also to FIGS. 2-3, the vanes 30 are arranged in a circular array around the turbine wheel 12, and are located between the turbine volute 10 and the turbine wheel 12. The vanes 30 are pivotably supported in this configuration between a generally annular upper vane ring 40 and a generally annular lower vane ring 42, where "upper" refers to being closer to the center bearing housing 16, and "lower" refers to being closer to the turbine housing 4. Each vane 30 rotates on a post 32 that protrudes from the opposed side faces of the vane 30, with the post 32 defining a pivot axis 35. The free ends of the post 32 are received in respective apertures in the upper vane ring 40 and the lower vane ring 42. The angular orientation of the upper vane ring 40 relative to the lower vane ring 42 is set such that the corresponding apertures in the vane rings 40, 42 are concentric with the axis 35 of the posts 32, and the vane 30 is free to rotate about the axis 35. On the upper vane ring-side of the vane 30, the post 32 protrudes through corresponding aperture of the upper vane ring 40 and is affixed to a vane arm 36, which controls the rotational position of the vane 30 with respect to the vane rings 40, 42. An adjustment ring assembly 45 is arranged adjacent to, and in parallel with, the upper vane ring 40, and controls the position of all of the vane arms 36 in unison.

The adjustment ring assembly 45 includes the adjustment ring 50, small slide blocks 47 rotatably disposed on the turbine-facing side of the adjustment ring 50, and a large block 46 that is rotatably disposed on the compressor-facing side the adjustment ring 50 and is used to connect the adjustment ring 50 to an actuator. In use, the adjustment ring assembly 45 rotatably drives the vanes 30 via the vane arms 36, which link the adjustment ring assembly 45 to the individual vanes 30. In many configurations, forks 37 are formed on the ends of the vane arms 36 drive the independently rotatable slide blocks 47 to minimize friction in the system and to accommodate distortion and corrosion in the turbine housing, and thus the linkages. The adjustment ring 50 is allowed to rotate circumferentially with minimal friction, and is aligned radially so that it remains concentric with the upper and lower vane rings 40, 42, and axially so that the slide blocks 47 remain in contact with the vane arms 36.

The adjustment ring 50 is supported by ramparts 38 on the vane arms 36. The large block 46 is connected by a shaft to the adjustment ring 50. Circumferential motion of the large block 46 about the turbocharger rotational axis R causes the adjustment ring 50 to rotate about the turbocharger rotational axis R. Rotation of the adjustment ring 50 about the turbocharger rotational axis R causes the multiple small slide blocks 47 to rotate about the turbocharger rotational axis R while each of the slide blocks 47 also rotate about the rotational axis 35 of the vane posts 32. This motion of the slide blocks 47 causes the vane arms 36 to rotate about the rotational axis 35 of the vane posts 32 and change the angle of attack of the vanes 30 relative to the exhaust flow. The slide blocks 47 are designed so that the interface between each slide block 47 and the corresponding vane arm fork 37 is predominantly sliding friction over the entire area of one cheek of the rotating slide block 47. This design provides uniform load distribution, which reduces wear and provides greater life than in line contact, but conversely raises friction over that of a line contact design.

The rotational orientation of the adjustment ring 50 is controlled by an actuator 110 (shown schematically in FIG. 1) which is operatively connected to the large block 46 via a linkage 48 and an actuation pivot shaft 52, whereby the adjustment ring 50 can rotated about the rotational axis R. The actuator receives commands from an engine electronic control unit (ECU).

Figure 4:
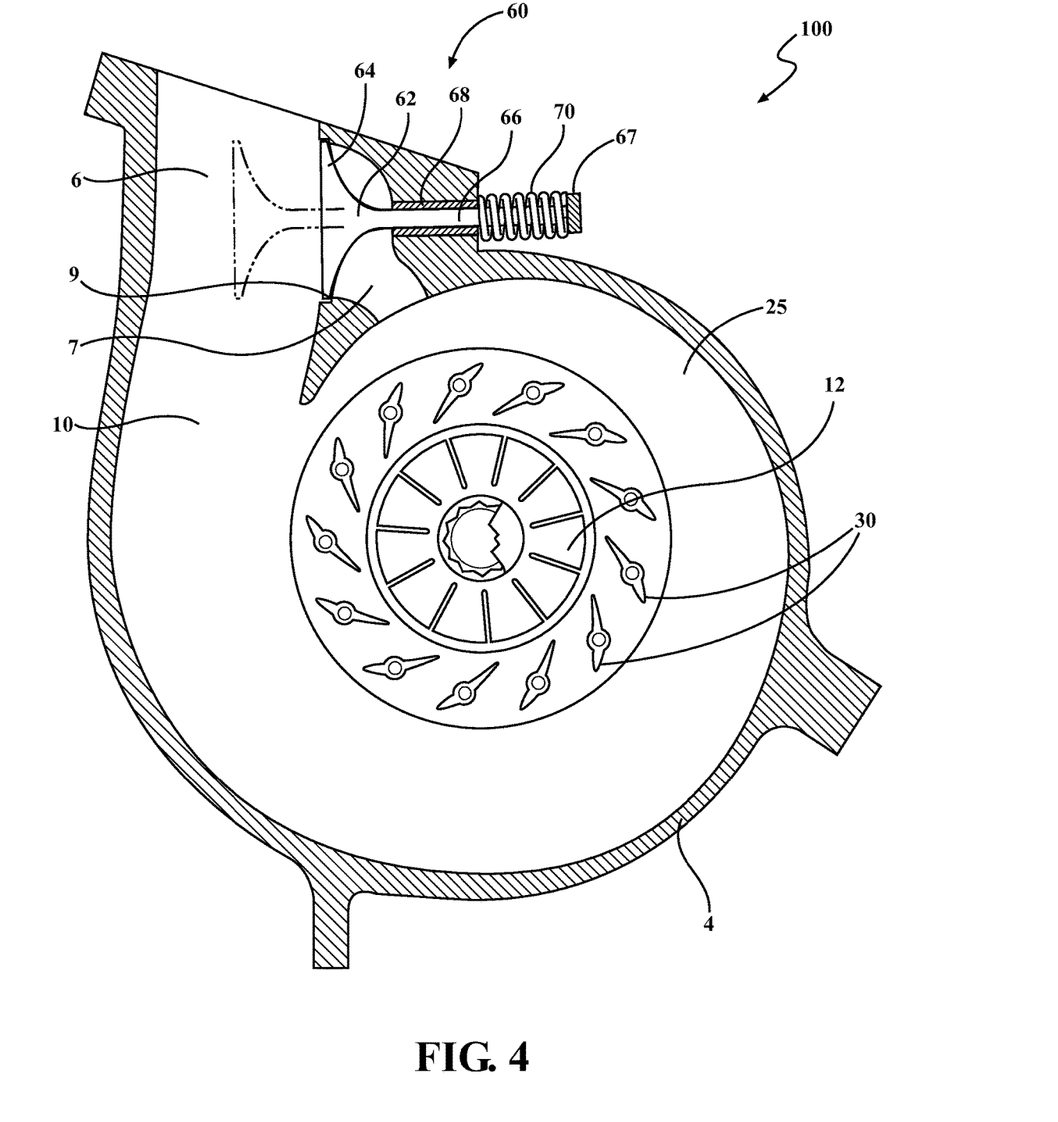
FIG. 4 is an end cross-sectional view of a turbine housing of the VTG turbocharger showing a wastegate including a wastegate poppet valve.

Referring to FIG. 4, the VTG turbocharger 100 with guide vanes 30 includes a wastegate assembly 60 in the same turbine housing 4. This is unlike most conventional exhaust flow-controlling turbochargers which include either a VTG assembly or a wastegate assembly, but not both assemblies. To accommodate higher flow rates of exhaust gas, the wastegate assembly 60 can be used to bypass some of the flow past the turbine wheel 12 entirely. A turbocharger 100 with both VTG guide vanes 30 and a wastegate assembly 60 in the same turbine housing 4 can bypass exhaust gas flow with a wastegate valve 62 at the upper ranges of the guide vanes 30 being opened.

The wastegate assembly 60 controls exhaust gas flow through a wastegate port 7 formed in the exhaust gas inlet 6 of the turbine housing 4 at the beginning of the turbine volute 10. The wastegate port 7 communicates with the exhaust gas outlet 8. The wastegate assembly 60 includes a wastegate valve 62 that selectively opens the wastegate port 7 to control exhaust gas flow through the wastegate port 7, and a valve spring 70 that biases the wastegate valve 62 to a closed position. The wastegate valve 62 is a poppet valve including a valve head 64 arranged perpendicularly and fixed to an end of a valve stem 66. The valve stem 66 is supported within an opening the turbine housing 4 via a bushing 68. The valve head 64 is linearly moveable within with respect to a valve seat 9 of the wastegate port 7 for blocking and opening the wastegate port 7 thereby controlling the exhaust gas flow. When the valve head 64 is seated on the valve seat 9 (e.g., in a closed position), the wastegate port 7 is blocked and all exhaust gas flows through the volute 10 to the turbine wheel 12 (shown in solid lines). When the valve head 64 is moved to a position spaced apart from the valve seat 9 (e.g., in an open position, shown in broken lines), some exhaust gas flow can bypass the turbine wheel 12 to control turbine work in that the turbine wheel 12 rotates at controlled speeds.

The wastegate valve 62 is controlled to allow bypass gas flow to control the maximum boost pressure. In the VTG turbocharger 100, a common actuator actuates both the VTG assembly 25 including the guide vanes 30 and the wastegate valve 62. For example, the actuator 110 is used to control the movement of the VTG assembly 25 and the wastegate valve 62. At low and modest rates of exhaust gas flow through the turbine housing 4, the wastegate valve 62 remains closed, while the VTG assembly 25 is used to control gas flow to the turbine wheel. For some exhaust gas flow rates, the guide vanes 30 and the wastegate valve 62 are both at least partially open at the same time. At very high rates of exhaust gas flow through the housing, for example, the guide vanes (30) and the wastegate valve (62, 262) are fully open at the same time.

Figure 5:
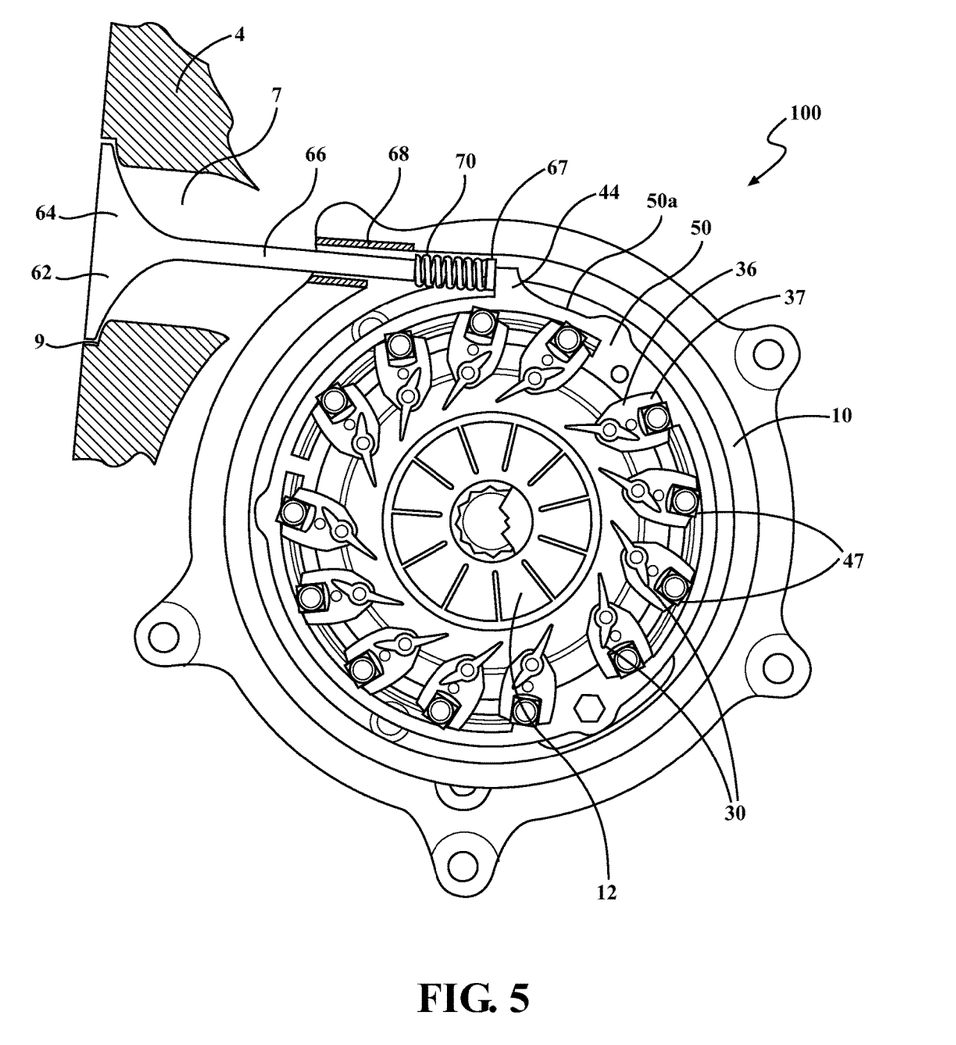
FIG. 5 is an end cross-sectional view of a turbine housing of the VTG turbocharger showing a wastegate including an alternative configuration wastegate poppet valve.

Referring to FIG. 5, in some embodiments, elements in association with the VTG assembly 25 such as the adjustment ring 50 can be used to both operate the wastegate valve 62 and control the position of the vanes 30. To this end, the adjustment ring 50 includes a radially-outwardly protruding tab 44 formed on a peripheral edge 50a thereof. The tab 44 is positioned along the circumference of the peripheral edge 50a of the adjustment ring 50 so as to engage a distal end 67 of the valve stem 66 at a desired rotational angle of the adjustment ring 50 about the rotational axis R. In some embodiments, the tab 44 engages the valve stem 66 at an angular position of the adjustment ring 50 corresponding to at a set opening amount of the guide vanes 30 (i.e. when the guide vanes are 80 percent open). As the guide vanes 30 are opened further beyond the set point, the tab 44 continues to push into the valve stem 66, causing the wastegate valve 62 to open further. The wastegate valve 62 is ideally fully open when the guide vanes 30 are fully open. The VTG assembly 25 works in conjunction with the wastegate valve 62 that can open a wastegate port 7 in the inlet of the turbine housing 4 at the beginning of the volute 10 so exhaust gas can bypass the turbine wheel 12.

In the embodiments shown in FIGS. 4 and 5, in which the wastegate valve 62 operates on an arm as a valve stem 66 of a poppet valve or similar non-pivoting valve, the valve head 64 moves substantially linearly. The wastegate valve 62 is spring-loaded to linearly reciprocate at substantial right angles from the valve seat 9. The wastegate valve 62 is closed via the spring 70 when not in contact the tab 44 of the adjustment ring 50 (i.e. in a position where the guide vanes 30 are closed or only slightly opened, such as occurs at a low flow rate).

Although the guide vanes 30 are actuated continuously (at all levels of exhaust flow through the turbine housing 4), the wastegate assembly 60 only starts to open at a predetermined configuration of the VTG assembly 25 in which the guide vanes 30 are open to a set amount. In the illustrated embodiment the set amount corresponds to the guide vanes 30 being fully open (such as 80 percent open to 100 percent fully open). The 80% vane-open engagement point is merely an example, with plausible values being from about 70-90% depending on the application of the turbocharger. The guide vanes 30 completely (e.g., solely) control exhaust gas flow until the set amount of opening is reached. At that time, bypass via the wastegate assembly 60 is begun. During bypass, all exhaust gas flow is not directed through the turbine wheel 12, but some flow can bypass the turbine wheel 12 by passing through the wastegate port 7 to the exhaust gas outlet 8.

Beyond the tab and poppet valve example illustrated in FIG. 5, other linkages and arrangements are possible. For example, referring to FIG. 6, an alternative VTG turbocharger 200 includes VTG assembly 25 and a modified wastegate assembly 260 in the same turbine housing 4. The VTG turbocharger 200 is similar to the VTG turbocharge 100 described above with respect to FIGS. 1-5, and common reference numbers refer to common elements. The modified wastegate assembly 260 includes a conventional rotating wastegate valve 262 such as a flap-type valve, a linkage 265 that converts a linear motion provided by the tab 44 of the adjustment ring 50 into a rotary motion, and a spring 269 that biases the wastegate valve 262 to the closed position.

Figure 6:
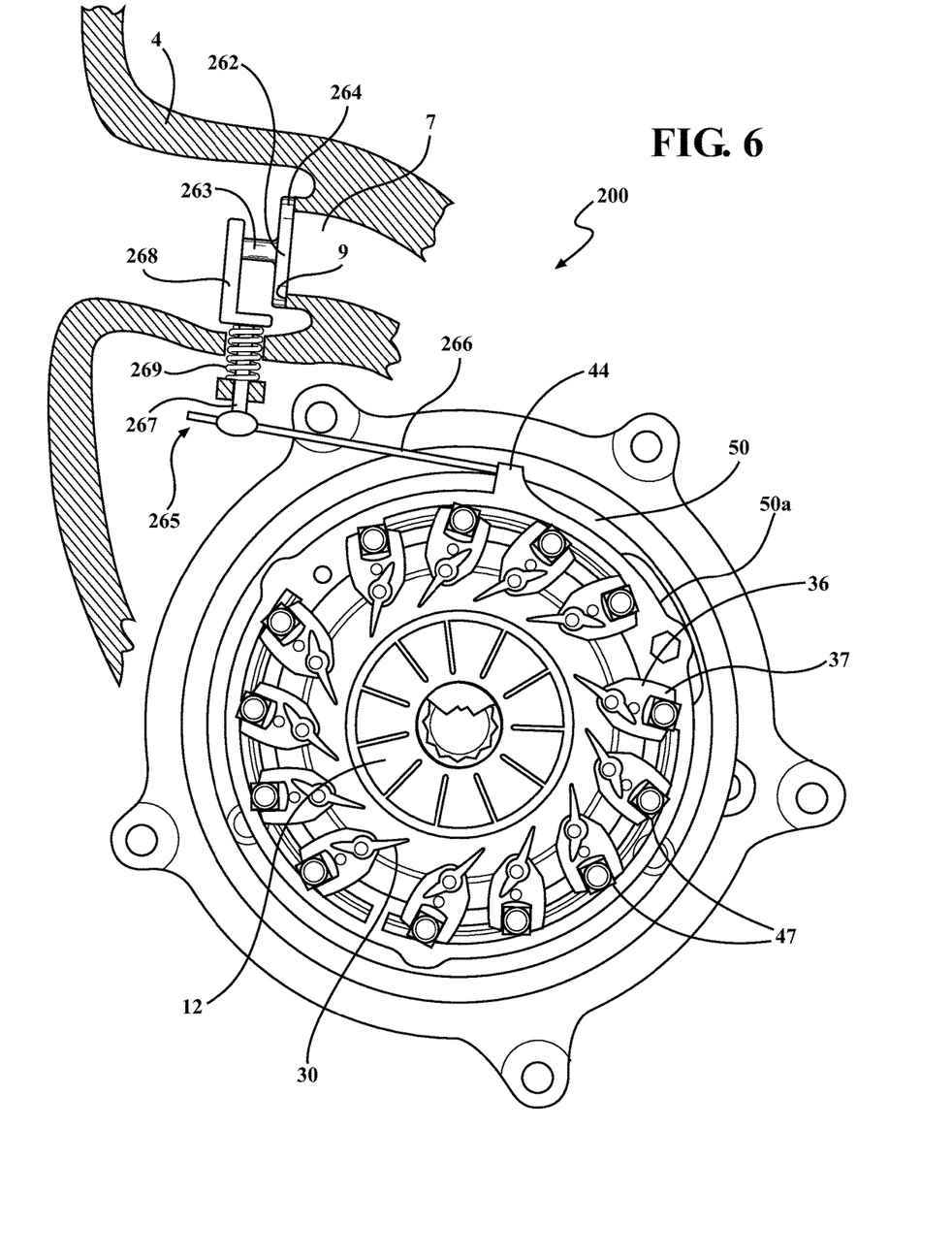
FIG. 6 is an end cross-sectional view of a turbine housing of the VTG turbocharger showing a wastegate including a rotating wastegate valve.

The wastegate valve 262 includes a valve head 264 and a valve arm 263 that is fixed to, and extends from, the valve head 264. The valve arm 263 is fixed to a pivot shaft 268 that extends transverse to an axis of the valve arm 263 and forms part of the linkage 265. The linkage 256 also includes a lever arm 267 that connects the pivot shaft 268 to a push rod 266. The spring 269, such as a torsion spring, surrounds a portion of the pivot shaft 268, and extends between the pivot shaft 268 and the turbine housing 4. The spring 269 urges the pivot shaft 268 to rotate in a closing direction of the wastegate valve 262. In use, the tab 44 of the adjustment ring 50 engages a distal end of the push rod 266 at an angular position of the adjustment ring 50 corresponding to at a set opening amount of the guide vanes 30 (i.e. when the guide vanes are 80 percent open). As the guide vanes 30 are opened further beyond the set point, the tab 44 continues to push into the push rod 266, causing the wastegate valve 262 to open further. The wastegate valve 262 is ideally fully open when the guide vanes 30 are fully open. The VTG assembly 25 works in conjunction with the wastegate valve 262 that can open a wastegate port 7 in the inlet of the turbine housing 4 at the beginning of the volute 10 so exhaust gas can bypass the turbine wheel 12.

Thus, the valve head 264 is angularly moveable within with respect to a valve seat 9 of the wastegate port 7 for blocking and opening the wastegate port 7 thereby controlling the exhaust gas flow. When the valve head 264 is seated on the valve seat 9 (e.g., in a closed position), the wastegate port 7 is blocked and all exhaust gas flows through the volute 10 to the turbine wheel 12 (shown in solid lines). When the valve head 264 is pivoted to a position spaced apart from the valve seat 9, some exhaust gas flow can bypass the turbine wheel 12 to control turbine work in that the turbine wheel 12 rotates at controlled speeds.

Each wastegate assembly 60, 260 includes a wastegate valve 62, 262 that is selectively opened by an actuator 110. In some embodiments, the actuator 110 actuates the wastegate valve 62, 262 via a rod (e.g., the valve stem 66 or the push rod 266) directly or indirectly connected to a valve head 64, 264. The rod is driven by the tab 44 to operably control the valve head 64, 264 and is constructed and arranged to move the valve head 64, 264 with respect to the wastegate port 7 to control the exhaust gas flow through the wastegate port 7. The wastegate valve 62, 262 is configured to selectively allow exhaust gas flow to bypass the turbine wheel 12 through the wastegate port 7.

The valve stem 66 or the push rod 266 may be operably attached to the valve head 64, 264 that selectively opens and closes the wastegate port 7. The valve head 64, 264 is moveable to at least a first position and a second position so that in the first position the wastegate port 7 is fully open, and in the second position, the wastegate port 7 is closed to preclude exhaust gas flow from flowing through the wastegate port 7. In the closed position, the valve head 64, 264 is secured against the valve seat 9, and spring action is used to hold the wastegate valve 62, 262 closed when the guide vanes 30 are closed or open less than the set amount. Intermediate positions of the valve head 64, 264 may allow for precise control of exhaust gas through the wastegate port 7.

By providing a wastegate valve 62, 262 in the VTG turbocharger 100, 200 the wastegate valve 62, 262 generally only needs to open at very high flow rates, such as when the guide vanes 30 are open at 70 percent, 80 percent, or more. Combining both a wastegate assembly 60, 260 and VTG assembly 25 in one turbocharger 100, 200 has added benefits at high flow rates, such as when small turbine wheels are used in certain applications. The common actuator 110, 50 controlling both the wastegate valve 62, 262 and VTG guide vanes 30 improves the combination and coordinates opening of the wastegate valve 62, 262 and the guide vanes 30.

Although the turbocharger 100 is described herein with a particular mechanism for controlling the variable turbine geometry, including pivotable vanes 30 driven in unison using an exemplary adjustment ring assembly 45, the mechanism for controlling the variable turbine geometry is not limited to the type shown in the illustrated embodiment. For example, the vanes 30 may be driven by a geared adjustment ring assembly and/or geared actuation system. For another example, the VTG assembly may not include pivotable vanes, and instead include sliding wall portions.

Certain combined actuators for both the turbine stage and compressor stage are contemplated with other turbochargers. A VTG turbocharger with a wastegate assembly may have a single actuator with a linkage assembly for controlling a wastegate control valve of the wastegate assembly and an active casing treatment control with slots to selectively circulate air relative to the compressor wheel. The single actuator may actively control flow channel geometry with flow control and also energize the active casing treatment flow control. During operation of a turbocharger, it would likely be desirable to energize the wastegate actuator and active casing treatment flow control of the compressor stage at the same time.

The invention has been described in an illustrative manner, and it is to be understood that the terminology used is intended to be in the nature of words of description rather than limitation. Many modifications and variations of the present invention are possible in light of the above teachings. It is, therefore, to be understood that within the scope of the appended claims, the invention may be practiced other than as specifically enumerated within the description.

What is claimed is:

1. A variable turbine geometry (VTG) turbocharger (100) with a turbine wheel (12) in a turbine housing (4) comprising:
    a VTG assembly (25) including a series of vane rings (40, 42, 50) and a series of pivotable guide vanes (30) that are operably connected to at least one of the vane rings (50);
    a wastegate assembly (60) including a wastegate valve (62, 262) configured to control exhaust gas flow through a wastegate port (7) in the turbine housing (4) thereby selectively bypassing the turbine wheel (12); and
    a common actuator (110, 50, 44) that controls movement of both the guide vanes (30) and the wastegate valve (62, 262),
    wherein the common actuator (110, 50, 44) controls the wastegate valve (62, 262) to move linearly with respect to the wastegate port (7).

2. The turbocharger (100) of claim 1 wherein the guide vanes (30) are actuated at all levels of exhaust gas flow through the turbine housing (4), and the wastegate valve (62, 262) is not actuated until the guide vanes (30) are open at a set amount.

3. A variable turbine geometry (VTG) turbocharger (100) with a turbine wheel (12) in a turbine housing (4) comprising:
    a VTG assembly (25) including a series of vane rings (40, 42, 50) and a series of pivotable guide vanes (30) that are operably connected to at least one of the vane rings (50);
    a wastegate assembly (60) including a wastegate valve (62, 262) configured to control exhaust gas flow through a wastegate port (7) in the turbine housing (4) thereby selectively bypassing the turbine wheel (12); and
    a common actuator that controls movement of both the guide vanes (30) and the wastegate valve (62, 262),
    wherein the common actuator is a tab (44) protruding from the at least one of the vane rings (50) and providing actuation of the wastegate valve (62, 262) to selectively open the wastegate port (7).

4. The turbocharger (100) of claim 3 wherein the wastegate valve (62, 262) is biased to a closed position via a spring (70, 269) disposed between the wastegate valve (62, 262) and the turbine housing (4), the spring (70, 269) configured so that a spring force of the spring (70, 269) can be overcome when the tab (44) contacts the wastegate valve (62, 262).

5. The turbocharger (100) of claim 3 wherein the common actuator (110, 50, 44) actuates the wastegate valve (262) to move rotatably with respect to the wastegate port (7), and is connected to the wastegate (262) via a push rod (266).

6. A variable turbine geometry (VTG) turbocharger (100) comprising
    a turbine wheel (12) in a turbine housing (4),
    a VTG assembly (25) including an adjustment ring (50) and a plurality of pivotable guide vanes (30) that are operably connected to the adjustment ring (50),
    a wastegate assembly (60) including a wastegate valve (62, 262) configured to control exhaust gas flow through a wastegate port (7) in the turbine housing (4) thereby selectively bypassing the turbine wheel (12), and
    a common actuator (44) disposed on the adjustment ring (50) that controls movement of both the guide vanes (30) and the wastegate valve (62, 262), wherein the common actuator (44) is a tab (44) protruding from the at least one of the vane rings (50) and providing actuation of the wastegate valve (62, 262) to selectively open the wastegate port (7), and wherein the guide vanes (30) are actuated at all levels of exhaust gas flow through the turbine housing (4) and the wastegate valve (62, 262) is actuated based on an angular position of the adjustment ring (50) relative to the turbine housing (4).

7. The turbocharger (100) of claim 6 wherein the wastegate valve (62, 262) opens an angular position of the adjustment ring (50) corresponding to a high flow rate defined as when the guide vanes (30) are at least 70 percent open.

8. The turbocharger (100) of claim 6 wherein the wastegate valve (62, 262) opens an angular position of the adjustment ring (50) corresponding to a high flow rate defined as when the guide vanes (30) are at least 80 percent open.

* * * * *